US011257172B2

(12) United States Patent
Bender et al.

(10) Patent No.: US 11,257,172 B2
(45) Date of Patent: Feb. 22, 2022

(54) COGNITIVE BASED DECISION SUPPORT SYSTEM FOR AGRICULTURE

(71) Applicant: International Business Machines Corporation, Armonk, NY (US)

(72) Inventors: Michael Bender, Rye Brook, NY (US); Gautam K. Bhat, Kadri (IN); Rhonda L. Childress, Austin, TX (US); Nalini Muthurajan, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 1121 days.

(21) Appl. No.: 15/497,560

(22) Filed: Apr. 26, 2017

(65) Prior Publication Data

US 2018/0314949 A1 Nov. 1, 2018

(51) Int. Cl.
*G06Q 50/02* (2012.01)
*G06N 5/04* (2006.01)
*A01B 79/00* (2006.01)
*G16Y 10/05* (2020.01)

(52) U.S. Cl.
CPC ............ *G06Q 50/02* (2013.01); *A01B 79/005* (2013.01); *G06N 5/045* (2013.01); *G16Y 10/05* (2020.01)

(58) Field of Classification Search
CPC ........ G06Q 50/02; G06N 5/045; G06N 20/00; A01B 79/005
See application file for complete search history.

(56) References Cited

U.S. PATENT DOCUMENTS

| 5,751,576 A | 5/1998 | Monson |
| 6,947,662 B1 | 9/2005 | Shibata et al. |
| 9,880,537 B2 * | 1/2018 | Mewes ................ A01G 25/167 |
| 2016/0078569 A1 | 3/2016 | Ethington et al. |
| 2016/0232621 A1 * | 8/2016 | Ethington .............. G06Q 50/02 |
| 2016/0253595 A1 * | 9/2016 | Mathur .............. G01N 33/0098 706/12 |
| 2018/0027725 A1 * | 2/2018 | Koutsorodi .......... A01B 79/005 |

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

* cited by examiner

*Primary Examiner* — Benjamin P Geib
(74) *Attorney, Agent, or Firm* — Heslin Rothenberg Farley & Mesiti P.C.; Michael A. Petrocelli, Esq.

(57) ABSTRACT

A method, computer program product, and system includes a processor(s) obtaining real time data related to an agricultural site by continuously monitoring remote data collection entities at the agricultural site, which include satellites, ground monitoring stations, and sensors. The processor(s) determine which data of the real time data can be utilized in subsequent decisions and accumulate a portion of the real time data in a data store, based on a timestamp of the portion indicating that the portion of the real time data is no longer current and is historical data. Based on obtaining a request for a recommendation, the processor(s) generate based on a cognitive analysis of the historical data, the real time data that can be utilized, and the agricultural data from the controlled environment, at least one agricultural model. The processor(s) determine the recommendation from the model and transmit the recommendation to the client.

17 Claims, 9 Drawing Sheets

400

USER CONNECTS TO AN EMBODIMENT OF THE PRESENT INVENTION UTILIZING A PERSONAL COMPUTING DEVICE, FOR EXAMPLE, VIA A MOBILE APPLICATION, TO MAKE AN INQUIRY FOR A LOCATION (FIELD) —410

BASED ON RECEIVING AN INQUIRY FROM THE PERSONAL COMPUTING DEVICE, ONE OR MORE PROGRAMS IN AN EMBODIMENT OF THE PRESENT INVENTION ANALYZE REAL TIME DATA COLLECTED CONTINUOUSLY BY THE ONE OR MORE PROGRAMS BY MONITORING THE LOCATION, UTILIZING BASE LINE DATA COLLECTED BY THE ONE OR MORE PROGRAMS FROM LABORATORY SETTINGS —420

ONE OR MORE PROGRAMS OBTAIN CURRENT CROP REMOTE SENSING DATA USING LOCAL SENSORS AND SATELLITE IMAGES FOR A GIVEN LOCATION FOR A GIVEN PLANT —510

ONE OR MORE PROGRAM OBTAIN A SPECTRAL SIGNATURE DATA OF THE GIVEN PLANT AT THE GIVEN LOCATION FROM A CONTROLLED ENVIRONMENT —520

ONE OR MORE PROGRAMS DETERMINE WHETHER A DIFFERENCE BETWEEN THE REMOTE SENSING DATA AND THE SPECTRAL SIGNATURE DATA IS WITHIN AN ACCEPTABLE LIMIT —530

BASED ON DETERMINING THAT THE DIFFERENCE IS WITHIN THE ACCEPTABLE LIMIT, THE ONE OR MORE PROGRAMS NOTIFY THE USER THAT IT IS TIME TO HARVEST THE GIVEN PLANT —540

FIG. 5

COGNITIVE BASED DECISION SUPPORT SYSTEM FOR AGRICULTURE

BACKGROUND

Agriculture is complex and unpredictable in nature. Although a farmer's past experiences plays an important role in maintaining high business revenues, these revenues are impacted by the fact that farmers are unable to predict the natural and unnatural events that affect their day to day activities. Because population growth is ongoing, there is a necessity for increasing food production. Replacing manual processes, which are based largely on anecdotal and local knowledge, with cognitive processes, could potentially assist in improving both the accuracy and the efficiency of agronomy, the science of soil management and crop production.

SUMMARY

Shortcomings of the prior art are overcome and additional advantages are provided through the provision of a method for providing agronomical information. The method includes, for instance: obtaining, by one or more processors, real time data related to a given agricultural site by continuously monitoring remote data collection entities at the given agricultural site, wherein the remote data collection entities comprise satellites, ground monitoring stations, and sensors at the given agricultural site; determining, by the one or more processors, which data of the real time data can be utilized in subsequent agronomy decision-making; accumulating, by the one or more processors, a portion of the real time data in a data store, based on a timestamp of the portion of the real time data indicating that the portion of the real time data is no longer current and is historical data; in response to receiving a request for an agronomical recommendation regarding the given agricultural site from a client, querying, by the one or more processors, at least one computing resource accessible over a communications network, for agricultural data from a controlled environment; generating, by the one or more processors, based on a cognitive analysis of the historical data, the real time data that can be utilized, and the agricultural data from the controlled environment, at least one agricultural model; determining, by the one or more processors, based on the agricultural model, the agronomical recommendation regarding the given agricultural site; and transmitting, by the one or more processors, the agronomical recommendation to the client.

Shortcomings of the prior art are overcome and additional advantages are provided through the provision of a computer program product for providing agronomical information. The computer program product comprises a storage medium readable by a processing circuit and storing instructions for execution by the processing circuit for performing a method. The method includes, for instance: obtaining, by the one or more processors, real time data related to a given agricultural site by continuously monitoring remote data collection entities at the given agricultural site, wherein the remote data collection entities comprise satellites, ground monitoring stations, and sensors at the given agricultural site; determining, by the one or more processors, which data of the real time data can be utilized in subsequent agronomy decision-making; accumulating, by the one or more processors, a portion of the real time data in a data store, based on a timestamp of the portion of the real time data indicating that the portion of the real time data is no longer current and is historical data; in response to receiving a request for an agronomical recommendation regarding the given agricultural site from a client, querying, by the one or more processors, at least one computing resource accessible over a communications network, for agricultural data from a controlled environment; generating, by the one or more processors, based on a cognitive analysis of the historical data, the real time data that can be utilized, and the agricultural data from the controlled environment, at least one agricultural model; determining, by the one or more processors, based on the agricultural model, the agronomical recommendation regarding the given agricultural site; and transmitting, by the one or more processors, the agronomical recommendation to the client.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 4 is a workflow illustrating certain aspects of an embodiment of the present invention;

FIG. 5 is a workflow illustrating certain aspects of an embodiment of the present invention;

DETAILED DESCRIPTION

Figure 1:
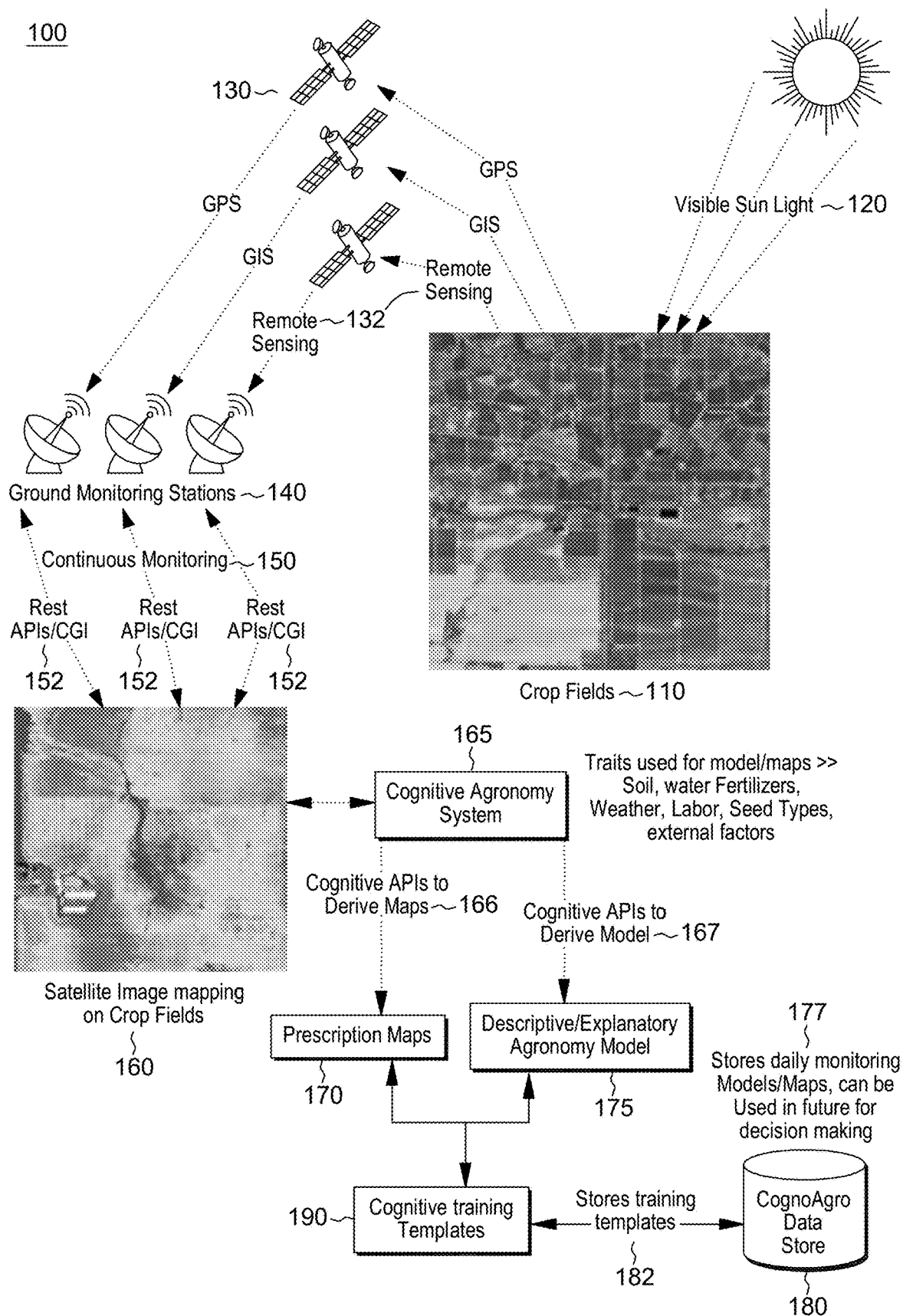
FIG. 1 is an illustration of various aspects of an embodiment of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 7:
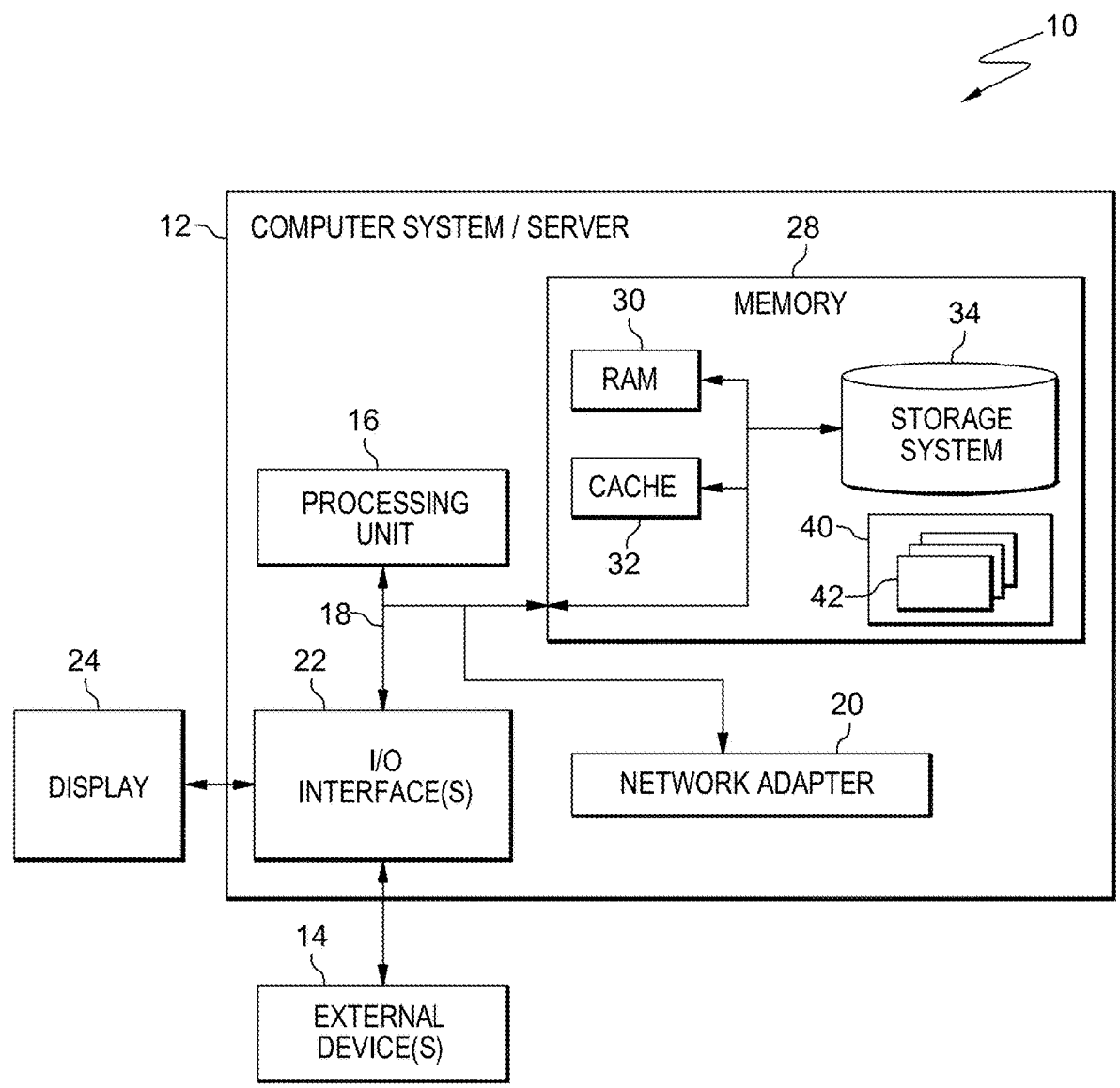
FIG. 7 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 7 as program/utility 40, having a set (at least one) of program modules 42, may be stored in memory 28.

In embodiments of the present invention, a computer-implemented method, a computer program product, and a computer system include program code that provides a cognitive deep analysis of patterns on various agriculture factors, including but not limited to soil, climate, environment, markets, labor, and/or finances. This analysis contributes to an accurate analysis and accurate subsequent agronomy decision-making. Embodiments of the present invention also utilize satellite imagery, remote sensing data (e.g., from IoT devices), farmers' inputs, technology improvements in agriculture (e.g., precision farming and variable rate technology (VRT)), and/or phenotyping for analysis and decision-making. As understood by one of skill in the art, a phenotype is the set of observable characteristics of an organism (animal, plant) resulting from the interaction of its genotype with the environment. Whereas a genotype is the genetic makeup of an organism, a phenotype is how genetic and environmental influences come together to create an organism's physical appearance and behavior. As will be described herein, embodiments of the present invention can be utilized not only to maximize yield of a given crop, but also, to maximize profitability, using, for example, historical data and/or future market forecasts from financial services companies. As will be discussed herein, embodiments of the present of the present invention can consume data from a large variety of sources in order to generate recommendations that users can utilize to make economically advantageous agricultural decisions.

As will be discussed in greater detail herein, one or more programs in some embodiments of the present invention provide the following advantages/functionalities: 1) generate an agronomy model of each crop, phase by phase, from across locations by extracting remote sensing data from disparate standardized sources; 2) derive relationships between real crop field and sampling data (model), stored in a data store; 3) analyze phenotype data model maps retrieved from phenotyping platform; and 4) adjust a planting mix based on historic yields and predicted weather patterns Embodiments of the computer-implemented method, computer program product, and computer system include program code that provides an efficient support system for an agronomist in a variety of varying scenarios, five of which follow. First, while farmers used to function as agronomist (through primarily trial and error), presently a Certified Agronomist is a consultant having the responsibility of providing details on the nature of soil, what kind of plants/crops can be sowed, water irrigation, how deep can the crop grow beneath the ground, yielding mechanisms, type of fertilizers etc., to farmers. Embodiments of the present invention automate the collection and delivery of this information to users, which include farmers. Second, presently, phenotype systems in the laboratories (i.e., controlled environments) produce data related to the life cycle of the crop traits (e.g., expected growth, timing to produce yield, reaction to weather conditions, and susceptibility to diseases). Embodiments of the present invention obtain and generate training data to allow it to provide these same insights without the necessity of the controlled environments. Third, today, agronomists manually develop models (e.g., prescription models) for regarding nature of soil, what kind of plants/crops can be sowed, water irrigation, how deep can the crop grow beneath the ground, yielding mechanisms, type of fertilizers, etc., that are fed to variable rate farming equipment (e.g., feeders, spreaders), which in turn sow calculative amount of seeds (during plowing). Embodiments of the present invention include one or more programs that serve to automate this entire process, from model generation to instructing the farming equipment. Fourth, in embodiments of the present, the one or programs increase in accuracy because they are trained by continuously comparing historical data, laboratory (controlled environment) data, and real time data (obtained by monitoring remotely). Fifth, embodiments of the present invention take advantage of data and processes in existing systems, building upon these systems, because one or more programs in embodiments of the present invention collaborates/integrates with several agencies (the National Aeronautics and Space Administration, NASA, DigitalGlobe etc), government institutions, and/or universities for gathering data through REST APIs (e.g., coordinates, images), and through other existing means (e.g., existing government processes).

Embodiments of the present invention include various aspects that provide advantages over existing agronomy systems and approaches. For example, some embodiments of the present invention include one or more programs that extract sensing data from disparate standardized sources and generate an agronomy model utilizing this disparate data. Also, one or more programs in embodiments of the present invention may derive relationships between real crop field and sampling data (i.e., model data), stored in data store. Embodiments of the present invention can also be integrated with existing monitoring systems for certain types of crops with cognitive application program interfaces (APIs), to generate templates for use with defined parameters.

The remote sensing utilized in embodiments of the present invention is enabled, in part, by the Internet of Things (IoT). The IoT is a system of interrelated computing devices, mechanical and digital machines, objects, animals and/or people that are provided with unique identifiers and the ability to transfer data over a network, without requiring human-to-human or human-to-computer interaction. These communications are enabled by smart sensors, which include, but are not limited to, both active and passive radio-frequency identification (RFID) tags, which utilize electromagnetic fields to identify automatically and to track tags attached to objects and/or associated with objects and people. Smart sensors, such as RFID tags, can track environmental factors related to an object, including but not limited to, temperature and humidity. The smart sensors can be utilized to measure temperature, humidity, vibrations, motion, light, pressure and/or altitude. Because the smart sensors carry unique identifiers, a computing system that communicates with a given sensor can identify the source of the information. Within the IoT, various devices can communicate with each other and can access data from sources available over various communication networks, including the Internet. As will be discussed herein, IoT devices assist in collecting and broadcasting data that is utilized by one or more programs in an embodiment of the present invention in providing cognitive-based agronomy assistance.

As will be discussed in greater detail herein, embodiments of the present invention include certain improvements over existing agronomy systems and methods that increase the efficiency and efficacy of determinations by program code in these embodiments. For example, one improvement over existing systems is that in embodiments of the present invention, one or more programs executing on at least one processing circuit scans traits of crops, utilizing visual recognition APIs. Parameters such as sunlight intensity, water quality, $CO_2$ proportion in the air, nutrients, air humidity, temperature, drought symptoms, and salinity are identified using the visual recognition APIs. In some embodiments of the present invention, one or more programs store these data and share these data with users (e.g., farmers) for use in decision making processes, including but not limited to when to harvest, what to do during unplanned events, etc. Embodiments of the present invention may also make recommendations to the users (e.g., farmers) regarding these actions. Although farmers are used as examples of users, one of skill in the art will recognize how individuals representing different groups will also benefit from utilization of embodiments of the present invention. In fact, FIGS. 6A-6B, which are discussed herein, include some other examples of communities of users.

Embodiments of the present invention automate what before included many manual processes. The automation improves the results, by eliminating possibilities for user errors, and produces this more accurate result more efficiently. For example, rather than generate prescription maps and plans manually (which is presently common), in embodiments of the present invention, one or more programs generate and prepare these maps and plans using a cognitive analysis that includes applying visual recognition APIs. In embodiments of the present invention, one or more programs provide crop analysis, soil analysis, and crop monitoring utilizing data received from one or more geographic information systems (GIS), one or more global positioning system (GPS), and remote sensing data, for example, from IoT devices within a vicinity of an area being utilized for an agricultural pursuit. In embodiments of the present invention, one or more program also utilize prescription map formulas, while the one or more programs of this cognitive system use to generate prescription maps for soil type, weeds regions, fertilizer required regions, and/or water irrigation requirements. The one or more programs can define high density and low density areas in these maps clearly based on the data. The one or more programs may retains these maps in a data store (e.g., a cognitive agronomy data store) for future use in relevant conditions. As aforementioned, embodiments of the present invention can interface with existing applications to increase efficacy, thus, in some embodiments of the present invention, one or more programs load the data gathered and analyzed and the maps generated into a VRT system, based on a request from a user (e.g., farmer) or based on an automatic batch job. The VRT application can then utilize the data and maps for actual field operations, including but not limited to, spraying, planting, fertilizing, etc.

Another area in which embodiments of the present invention provide an automated, and therefore more efficient and accurate approach, in advisory services. In embodiments of the present invention, one or more programs (e.g., cognitive APIs), automatically provide agronomic advisory services. In embodiments of the present invention, one or more programs continuously monitor fields to gather real time data, including but not limited to, satellite image data and/or remote sensing data, for example, for IoT devices. Based on sampling models and models derived from controlled environment, the one or more programs (which can be understood as part of a cognitive agronomy system) derive relationships and gaps in the current crop field and generate prescription maps. The one or more programs may utilize mathematical formulas in making these derivations. The one or more programs may utilize evaluation reports and historical data in making recommendations to users. The one or more programs may establish the criteria for decision-making and based on the criteria, which can be configured in advance, the one or more programs identify patterns in the models.

Crop season analysis is yet another process that is automated and therefore, improved, by utilizing aspects of embodiments of the present invention. In general, crop season analysis is accomplished manually by agronomists comparing and analyzing various historical data. The analysis report produced can vary for each crop and for each phase of each crop. Embodiments of the present invention automate crop analysis through a cognitive approach because one or more programs analyze and identify seasonal patterns in huge historical data like prescription models, productivity maps, earlier analysis report, yield maps, and/or Normalized Difference Vegetation Index (NVDI) data, to generate analysis reports.

Rather than sampling data models, which can be time-consuming and of indeterminate accuracy, one or more programs in embodiments of the present invention continuously generate sampling data, which can be utilized at various points of execution of the one or more programs that comprise an embodiment of the present invention. One or more programs generate this sample data and store it in a data store (e.g., a cognitive agronomy data store). Data that is continuously obtained, analyzed, updated, applied, etc., by one or more programs in embodiments of the present invention includes, but is not limited to, prescription maps, NDVI maps, spectral signatures of each phase of crop [taken from controlled environments), sample models to characterize field conditions with respect to chemicals, soil nutrient maps, and yield maps. In embodiments of the present invention, one or more programs utilize these data as training data to provide comparisons and perspective.

Embodiments of the present invention provide improvement to the field of agriculture by enabling users such as farmers and individuals in food industries to analyze the food products remotely. Utilizing embodiments of the present invention, and specifically, utilizing cognitive methodology in agriculture, satisfies growing industry demands. Aspects of embodiments of the present invention an inextricably tied to computing because they rely upon high performance supercomputing, computational sciences, data analytics and optimization to enable an understanding of the complexities of agriculture and perfect predictions in this area. Thus, one or more programs in embodiments of the present invention analyze data from live satellite images, local IoT data, farmers' inputs. Based on analyzing soil, air and water quality remotely, one or more programs provide recommendations regarding how much organic product an individual or organization can produce from a given location. In order to make these recommendations, one or more programs in embodiments of the present invention utilize a variety of data from disparate sources, including but not limited to: 1) details related to different varieties of crops from the labs, from service providers etc.; 2) location-specific data dynamically collected (using satellites and GIS, e.g., GEOSYS, eLeaf, GMV, DigitalGlobe, and/or Cropio) by one or more programs in embodiments of the present invention, regarding soil/environment/irrigation/yield determination/organic matter in soil/drainage patterns (e.g., what type of crop was grown in the past, which crops have successfully repeated benefits, etc.); 3) vegetation Index maps (i.e., satellite image analysis maps) to provide more insights into crop status with respect to environment factors.

FIG. 1 is an illustration of various aspects of some embodiments of the present invention 100 and how these aspects work together as a decision support system for agriculture, termed a cognitive agronomy system 165. FIG. 1 illustrates how one or more programs of the cognitive agronomy system 165, in embodiments of the present invention, generate an agronomy model of each crop phase by phase in locations by pulling remote sensing data from various sources automatically, generate prescription maps for crop fields on each trait analysis, and load the model data into a data store 180, which is used by the one or more programs in decision-making, and derive relationships between real crop field data and model data stored in the data store 180. Although FIG. 1 represents a data store 180 as a single entity, as understood by one of skill in the art, the data store 180 is embodiments of the present invention may be comprised of one or more real and/or virtual resources.

One or more programs utilize continuous monitoring 150 of a crop field 110 to collect various data. As seen in FIG. 1, in embodiments of the present invention, as part of this continuous monitoring 150, one or more programs receive data from satellite monitoring 130 (e.g., GPS, remote sensing), sense levels of visible sun light 120 on a crop field 110, and interface with satellite image mapping 160 of the crop field 110 using REST APIs 152. In embodiments of the present invention, certain of the APIs may be part of a known cognitive agent, such as the IBM Watson® Application Program Interface (API), a product of International Business Machines Corporation. IBM Watson® is a registered trademark of International Business Machines Corporation, Armonk, N.Y., US. In some embodiments of the present invention APIs that support the one or more programs may include, but are not limited to, natural language classifiers, visual recognition applications, Alchemy (i.e., an IBM Watson® service for making inferences on images and text using artificial intelligence referred to as deep learning), Retrieve and Rank (i.e., a service available through the IBM Watson® Developer Cloud that can surface the most relevant information from a collection of documents), concepts/visual insights, trade off analytics, document conversion, and/or relationship extraction. In some embodiments of the present invention, one or more programs of the cognitive agronomy system 165 analyze the obtained real time monitoring data using one or more of visual recognition and Natural Language classifier APIs.

In embodiments of the present invention, the one or more programs utilize real time data, base line data, and historical data, stored in the data store 180, in generating models, maps, and other agronomical recommendations and plans. As aforementioned, in embodiments of the present invention, one or more programs executed on at least one processing circuit continuously monitor 150 crop fields 110 to get up to date data, i.e., the real time data. One type of data is remote sensing data 132, which, as illustrated in FIG. 1, one or more programs in an embodiment of the present invention may obtain from satellites 130 as well as from ground monitoring stations 132. The remote sensing data 132 may include spatial, spectral, radiometric, and temporal data and may originate from data sources such as NASA and Digital Globe. One or more programs in an embodiment of the present invention may also obtain data from GPS and GIS systems, from user (farmer) inputs, and from remote sensing devices that may be deployed local to a given crop field 110. Another source of real time data the one or more programs may continuously monitor 150 is publicly available weather forecasting details from weather reporting agencies, which the one or more programs may obtain by connecting to various computing nodes over a computing network, including over the Internet.

In embodiments of the present invention, one or more programs obtain various historical data and base line data. Sources for these types of data include, but are not limited to: controlled environment phenotype data from phenotype systems (e.g., yielding maps, prescription maps, productivity maps, soil maps, spectral signature of crops on each phase), historical farming data stored in the data store 180, which includes past real time monitoring data, best management practices, such as those available from online sources, social media, websites, online research journals, blogs, and weather forecasting agencies.

As seen in FIG. 1, another manner in which one or more programs in embodiments of the present invention may collect both real time monitoring data and controlled environment lab data (e.g., base line data) is by utilizing REST APIs calls or a traditional CGI interface 152 to interact with various systems.

As illustrated in FIG. 1, once the one or more programs of the cognitive agronomy system 165 collect (a threshold amount of) data through continuous monitoring 150. The one or more programs of the cognitive agronomy system 165 combine this data with various traits, in order to derive maps and models related, for example, to the crop field 110 and the particular crops that would be effective to grow on this crop field 110. In an embodiment of the present invention, traits used in this modeling include, but are not limited to, soil, water, fertilizers, weather, labor, seed types, and/or external factors. In order to collect this trait data, one or more programs in some embodiments of the present invention collaborate with various phenotyping platforms, including but not limited to, integrating to these platforms through the use of APIs. Based on this collaboration, the one or more programs can collect data related to soil types, yield details, chemical compounds in soil, irrigation types, weather conditions for past, near term and long range, and/or crop types.

Returning to FIG. 1, the one or more programs utilize the collected data and the traits to derive at least one prescription map 170 and at least one descriptive/exploratory agronomy model 175. In some embodiments of the present invention, one or more programs generate prescription maps 170 for crop fields on each trait analysis. Meanwhile, each agronomy model generated by the one or more programs is an agronomy model of each crop, phase by phase, from across locations, which, as illustrated in FIG. 1, the one or more programs generate by extracting the remote sensing data from disparate standardized and/or non-standardized sources. As illustrated in FIG. 1, in some embodiments of the present invention, to derive the map 170 and model 175, the one or more programs may utilize, in each case, separate cognitive APIs 166-167. In generating prescription maps 170 and agronomy models 175, the one or more programs may utilize cognitive linking templates 190. The one or more programs may also utilize the prescription maps 170 and agronomy models 175 to update the cognitive linking templates 190. The one or more programs may then store the templates 182 as training templates in the data store 180. Thus, in some embodiments of the present invention, the one or more programs generate corresponding maps, models and reports for further analysis. For example, the one or more programs may generate yielding maps, prescription maps, productivity maps, soil maps, and/or the spectral signatures of crops.

Returning to FIG. 1, the one or more programs of the cognitive agronomy system 165, store the daily monitoring data from the continuous monitoring 150, the derived models 175, and the derived maps 170, as contents 177, of a data store 180, for use in decision-making. The one or more programs may also store the cognitive linking templates 190 in this data store 180 for use in these processes. For example, utilizing the contents 177 of the data store, the one or more programs may derive relationships between real crop field and sampling data (model), stored in a data store, analyze phenotype data model maps retrieved from phenotyping platform; and adjust planting mixes, based on historic yields and predicted weather patterns.

Figure 2:
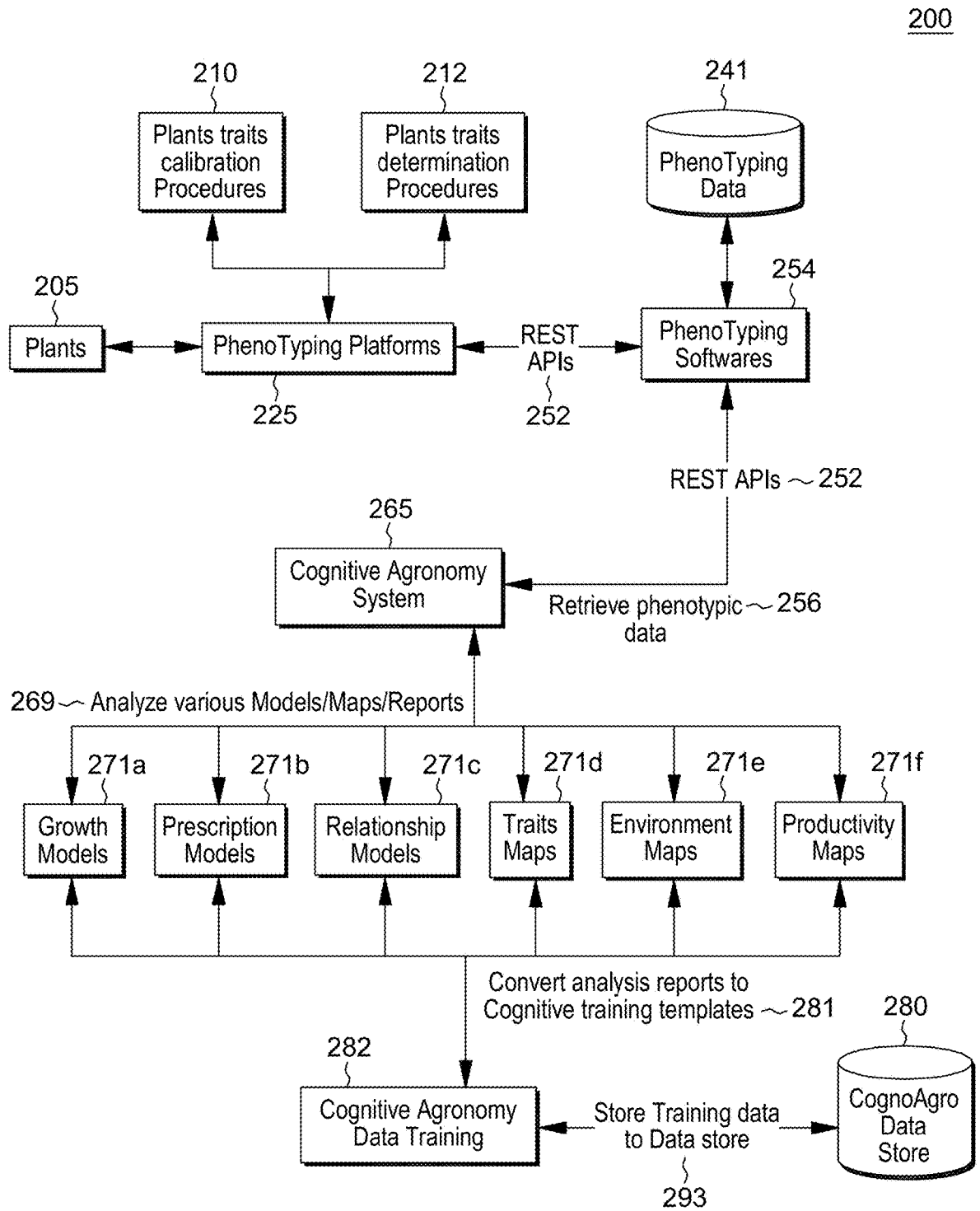
FIG. 2 is an illustration of various aspects of an embodiment of the present invention.

As aforementioned, in some embodiments of the present invention, one or more programs of the cognitive agronomy system 165 analyze phenotype data model maps retrieved from phenotyping platform in order to make recommendations to users (e.g., farmers). FIG. 2 is a workflow 200 that illustrates this automatic plant phenotyping functionality.

Referring to FIG. 2, in some embodiments of the present invention 200, one or more programs of a cognitive agronomy system 265 retrieve phenotypic data (256) from a phenotyping platform 225, including phenotype data model maps. In order to retrieve the phenotypic data (256), in some embodiments of the present invention, the one or more programs interface, for example, using REST APIs 252 with one or more phenotyping software 254 or application. This phenotyping software 254 receives phenotyping data 241 from one or more data source, including at least one phenotyping platform 225. The phenotyping platforms 225 access plant data 205, plant trait calibration procedures 210, and plant trait determination procedures 212. The phenotype data model maps can be generated by one or more program of a phenotyping platforms 225 and/or a phenotyping software 254.

One or more programs in some embodiments of the present invention analyze the phenotype data model maps retrieved from the phenotyping platform/software utilizing various parameters and criteria (269). These parameters and criteria may include, but are not limited to: plant height, grain yield, moisture content, soil feature, and/or watering methods. As illustrated in FIG. 2, the one or more programs analyze a variety of different data model maps. The specific models depicted in FIG. 2, (i.e., growth models 271*a*, prescription models 271*b*, relationship models 271*c*, trail maps 271*d*, environmental maps 271*e*, and productivity maps 271*f* In an embodiment of the present invention, one or more programs of the cognitive agronomy system 265 convert the analysis reports into cognitive training templates (281). As aforementioned, the one or more programs analyze the phenotype data model maps (269) and in some embodiments of the present invention, the one or more programs convert the analyses to a specific format (e.g., template) and store the template in a data store 280 (293). The templates may be common for all cognitive APIs. This utilization and analysis of phenotyping data by embodiments of the present invention constitutes activities that today are accomplished manually by individuals who are employed as agronomists.

Figure 3:
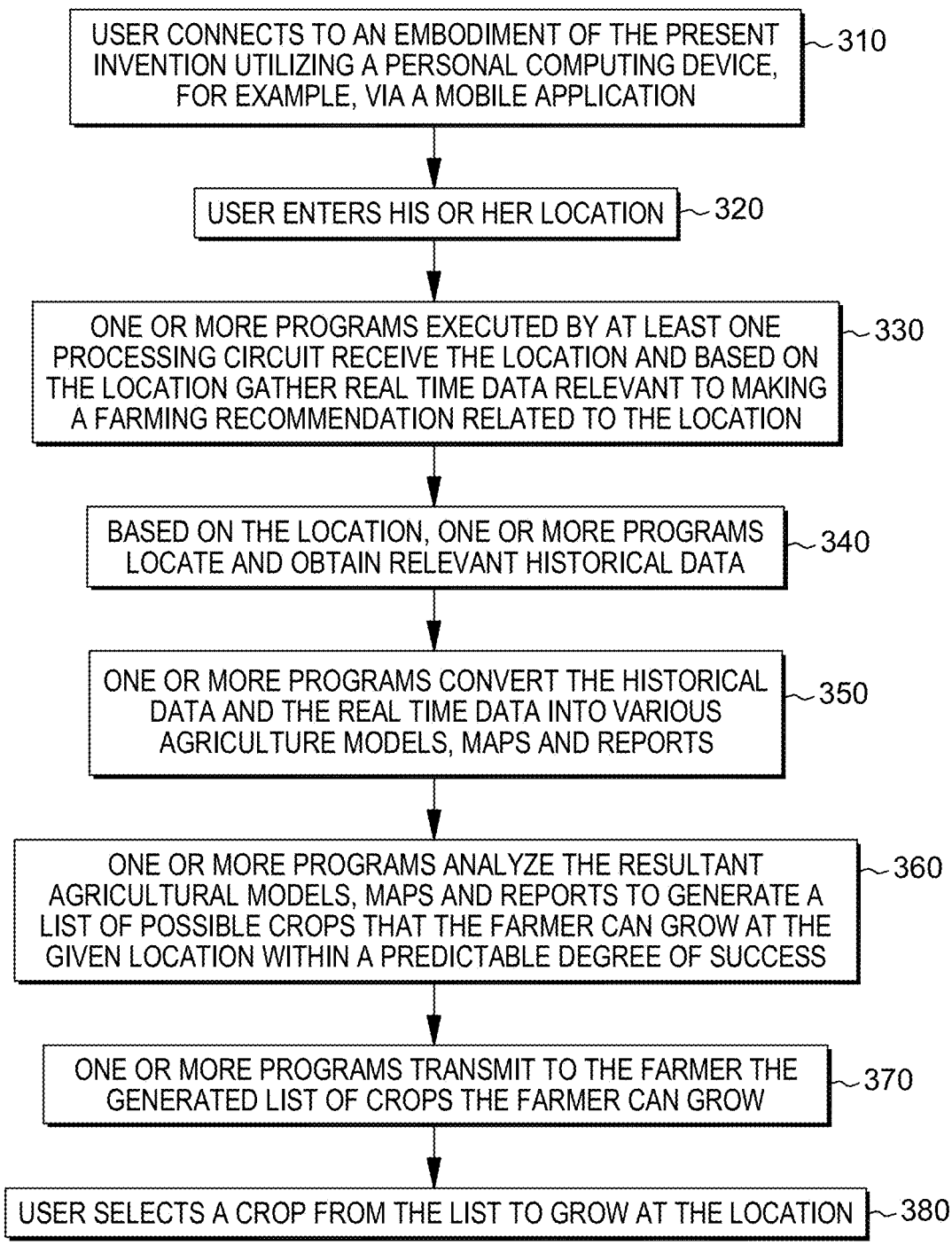
FIG. 3 is a workflow illustrating certain aspects of an embodiment of the present invention.

FIG. 3 is a workflow 300 that describes utilization of various aspects of some embodiments of the present invention by a given user, in this example, a farmer, who wants to check if a specific location is suitable for farming, and if so, what crops can be grown successfully as this location.

Referring to FIG. 3, the user connects to an embodiment of the present invention utilizing a personal computing device, for example, via a mobile application (310). Through a graphical user interface (GUI), the user enters his or her location (e.g., utilizing longitude and latitude signifiers) (320). One or more programs executed by at least one processing circuit receive the location and based on the location gather real time data relevant to making a farming recommendation related to the location (330). For example, in some embodiments of the present invention, the one or more programs access data sources including GIS, GPS, and may also receive remote sensing data from satellites (e.g., NASA, DigitalGlobe, etc.) and local Airborne data. In some embodiments of the present invention, the one or more programs utilize the GPS data to determine a position of the farming field(s) proximate to the location.

Returning to FIG. 3, based on the location, the one or more programs also locate and obtain relevant historical data (340). This historical data may include data regarding the farming history of the location which the one or more programs obtain from past historical data in a data store (which stores data of the type that was collected in real time and is no longer current), web sites, social media, news feeds, and/or government data sources.

The one or more programs convert the historical data and the real time data into various agriculture models, maps and reports, including but not limited to, crop maps, crop growth models, productivity maps, weed maps, etc. (350). In some embodiments of the present invention, the one or more programs may utilize one or more API to perform this conversion. The one or more programs analyze the resultant agricultural models, maps and reports to generate a list of possible crops that the farmer can grow at the given location within a predictable degree of success (which may be pre-configured) (360). In an embodiment of the present invention, one or more programs perform this analysis using one or more pf a natural language classifier, retrieve and rank APIs, and trade off analytics APIs. In certain embodiments of the present invention, to generate the list of possible crops that the farmer can grow at the given location within a predictable degree of success, the one or more programs utilize parameters, including but not limited to, location, current weather, soil features, water availability, current trends at the location and/or farming history data. The one or more programs transmit to the farmer the generated list of crops the farmer can grow (370). Subsequent to receiving this list, for example, in the GUI of the user's personal computing device, the user may select a crop from the list to grow at the location (380).

FIG. 3 demonstrates how embodiments of the present invention consume futures markets for all possible crops that would be considered for planting by a given farmer/user. As seen in FIG. 3, combined with the other inputs, one or more programs in an embodiment of the present invention determine which crop a given user should plant that will yield the largest economic return. As the future market is a curve and not a straight line, the one or more programs also determine the optimal planting time to maximize return based on the soil/weather forecast, etc.

In some embodiments of the present invention, in order to aid the user/farmer is making the best choice for a crop to grow at the location from the crops in the generated list, the one or more programs obtain and display additional details about the individual crops, which the one or more programs obtain from disparate data sources. Table 1 below is an example of certain data that the one or more programs provide to the user and the source from which the one or more programs obtained this data, in some embodiments of the present invention.

TABLE 1

| Crop Details | Source of Data |
| --- | --- |
| Availability of seeds | Government Data, private agencies |
| Best water irrigation mechanisms | Historical data from data store and phenotyping data from labs |
| Fertilizer details | Historical data from data store and phenotyping data from labs |
| Possible diseases, how to prevent | Phenotyping data from labs, data from government, social media |
| Growing time | Phenotyping data from labs |
| Best possible yielding time considering weather conditions | Phenotyping data from labs, historical data, weather data |
| Possible side crops, Any possible animal interventions like elephants etc. | Historical data, Research Journals Real time Satellite images |
| Soil type, soil nutrients, soil depth, | Remote sensing data, details from farmers, GIS |
| Wages details | Data from local agencies and government |
| Product selling options | Retail agencies, social media, news feeds |

Table 1 does not include an exhaustive list of all types of data consumed and/or utilized by one or more programs in embodiments of the present invention to select a crop that will maximize the overall return for the user. For example, in embodiments of the present invention, the one or more programs may also consume government or other incentives to plant a given crop, or not to plant a specific crop.

FIG. 4 is a workflow 400 that describes utilization of various aspects of some embodiments of the present invention by a given user, in this example, a farmer, who desires real time support for vegetation on a given field. The user connects to an embodiment of the present invention utilizing a personal computing device, for example, via a mobile application to make an inquiry for a location (field) (410). Based on receiving an inquiry from the personal computing device, one or more programs in an embodiment of the present invention analyze real time data collected continuously by the one or more programs by monitoring the location, utilizing base line data collected by the one or more programs from laboratory settings (420).

As illustrated in FIG. 1, the one or more programs continuously monitor crop growth at locations utilized by users using, for example, remote sensing data, local surveys (e.g., sensors fit into tractors or that are airborne) to determine the growth of crops at various locations during distinct timeframes. In embodiments of the present invention, the one or more programs compare this real time data with base line data collected from laboratories that represent each stage of growth for a given crop that is also at the location. In an embodiment of the present invention, the one or more programs utilize the normalized difference vegetation index (NDVI), a graphical indicator, to analyze the remote sensing measurements. In an embodiment of the present invention, as part of the analysis, the one or more programs apply the enhanced vegetation index (EVI) to the remote sensing measurements to enhance the vegetation signal with improved sensitivity in high biomass regions and improved vegetation monitoring through a de-coupling of the canopy background signal and a reduction in atmosphere influences. In an embodiment of the present invention, rather than provide real time support for vegetation on a given field responsive to an inquiry, the one or more programs provide automatic updates to a user at predetermined time intervals and/or when predetermined events occur. In some embodiments of the present invention, the one or more programs in analyze the real time data utilizing the base line data by comparing the actual crop status at the location and crop spectral signature, for example, using visual insights, visual recognition APIs.

As discussed above, embodiments of the present invention can provide automatic notifications to users, which enable the users to address critical issues. As illustrated in FIG. 1, in embodiments of the present invention, one or more programs continuously monitor various remote data sources and analyze this data. The monitored data may include, but is not limited to satellite data and airborne feeds for weather, crops status (e.g., vegetation index), soil features, water irrigations, fertilizers and weeds. The one or more programs analyze this data utilizing additional data from GPS, GIS, remote sensing systems (e.g., IoT devices), social media, news feeds. In this ongoing data collection and analysis, if the one or more programs recognizes a deviation, the one or more programs in embodiments of the present invention will automatically notify users of the deviation. Methods of notification may include, but are not limited to, push/broadcast messages to mobile devices, publication in news feeds, and/or broadcast to radio/TV mediums. Deviations may include, but are not limited to weather events, such as cyclones, floods, heavy rains, major diseases notifications, external interventions, which include animal interventions, and/or fertilizer shortages in the soil. In some embodiments of the present invention, the one or more programs may provide a mitigation plan with the notification. For example, in the event of hazardous weather, the one or more programs may provide recommended actions to mitigate damage, including suggesting an irrigation plans. If a soil analysis triggers a notification, the one or more programs may provide a recommendation to add more organic/inorganic fertilizers.

Returning to FIG. 4, based on the analysis, the one or more programs generate and transmit one or more recommendations for the user to perform preventive/corrective actions (420). In certain embodiments of the present invention, the one or more programs may automatically generate recommendations based on continuous analysis of the real time and laboratory data.

In embodiments of the present invention, the one or more programs provide a variety of different types of recommendations based on the analysis of the location and the comparison to data from outside of the location. For example, in some embodiments of the present invention, the one or more programs can assist farmers with the current trends on daily workers' wages in a particular location.

As part of the real time vegetation support, one or more programs in an embodiment of the present invention may also provide guidance to a user regarding harvesting. FIG. 5 is a workflow 500 that illustrates aspects of embodiments of the present invention providing assistance in harvesting timing to a user (farmer). In an embodiment of the present invention, the one or more programs obtain current crop remote sensing data using local sensors and satellite images for a given location for a given plant (510). The one or more program obtain a spectral signature data of the given plant at the given location (e.g., yielding phase) from a controlled environment (e.g., laboratory) (520). The one or more programs determine whether a difference between the remote sensing data and the spectral signature data is within an acceptable limit (e.g., according to the NDVI) (530). Based on determining that the difference is within the acceptable limit, the one or more programs notify the user that it is time to harvest the given plant (540). In an embodiment of the present invention, the notification includes harvesting options. Regarding harvest support, some embodiments of the present invention consume short term future markets and utilize this data to determine when to harvest a crop. While there may be time for a crop to increase in size, the one or more programs may determine that this timing is offset by the higher prices that are on the shorter end of the futures curve. In another embodiment of the present invention, the notification may also include local and international contacts for selling the given plant. To provide this information, the one or more programs obtain trends of a particular product of a farmer's interest using cognitive trends APIs and provide the user (farmer) with retailer (e.g., local, national, international) details, based on the analytics data, by collaborating with retail agencies.

Although users who are farmers certainly benefit from utilizing aspects of embodiments of the present invention, aspects of these embodiments are also beneficial to users in a variety of different groups. Embodiments of the present invention provide a portal for all users, including those situated in government, in both agriculture-related and non-agriculture-related departments and roles to access and thus, comprehend overall agriculture progress in relevant geographic regions.

In some embodiments of the present invention, through a GUI on a computing device, the one or more programs provide a portal that enables users to utilize the following functionality: 1) generate a comprehensive report on agriculture progress; 2) locate drought areas and need focus areas; 3) view water irrigation status, dam status, weather status, and request and receive irrigation options (e.g., regarding the timing of opening a dam for farming purposes); 4) generate a prediction for the harvesting and maximum possible yields from each region in a given geographic area; and/or 5) exchange communications with other users.

Figure 6A:
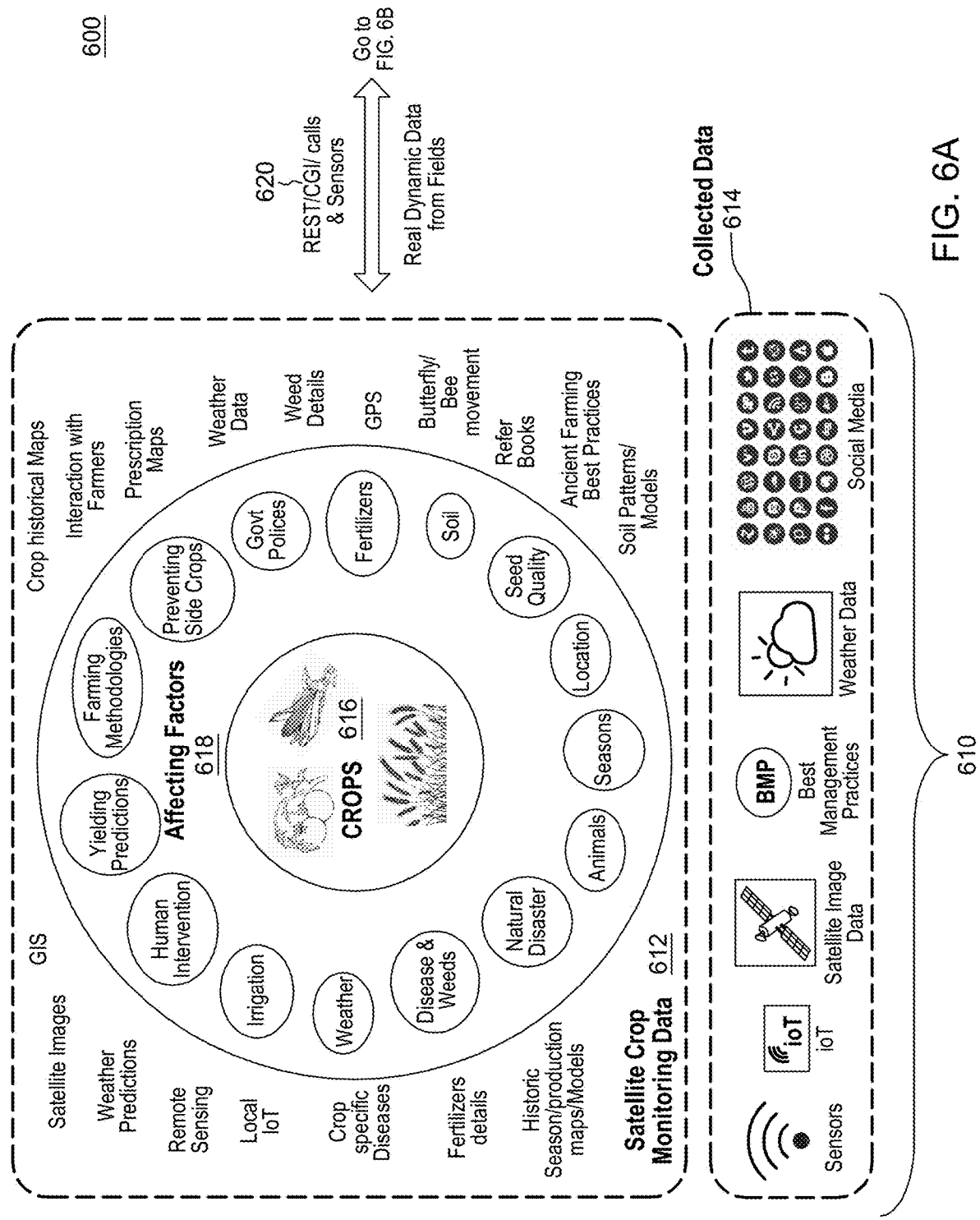
FIGS. 6A-6B are an illustration of various aspects of an embodiment of the present invention.
Figure 6B:
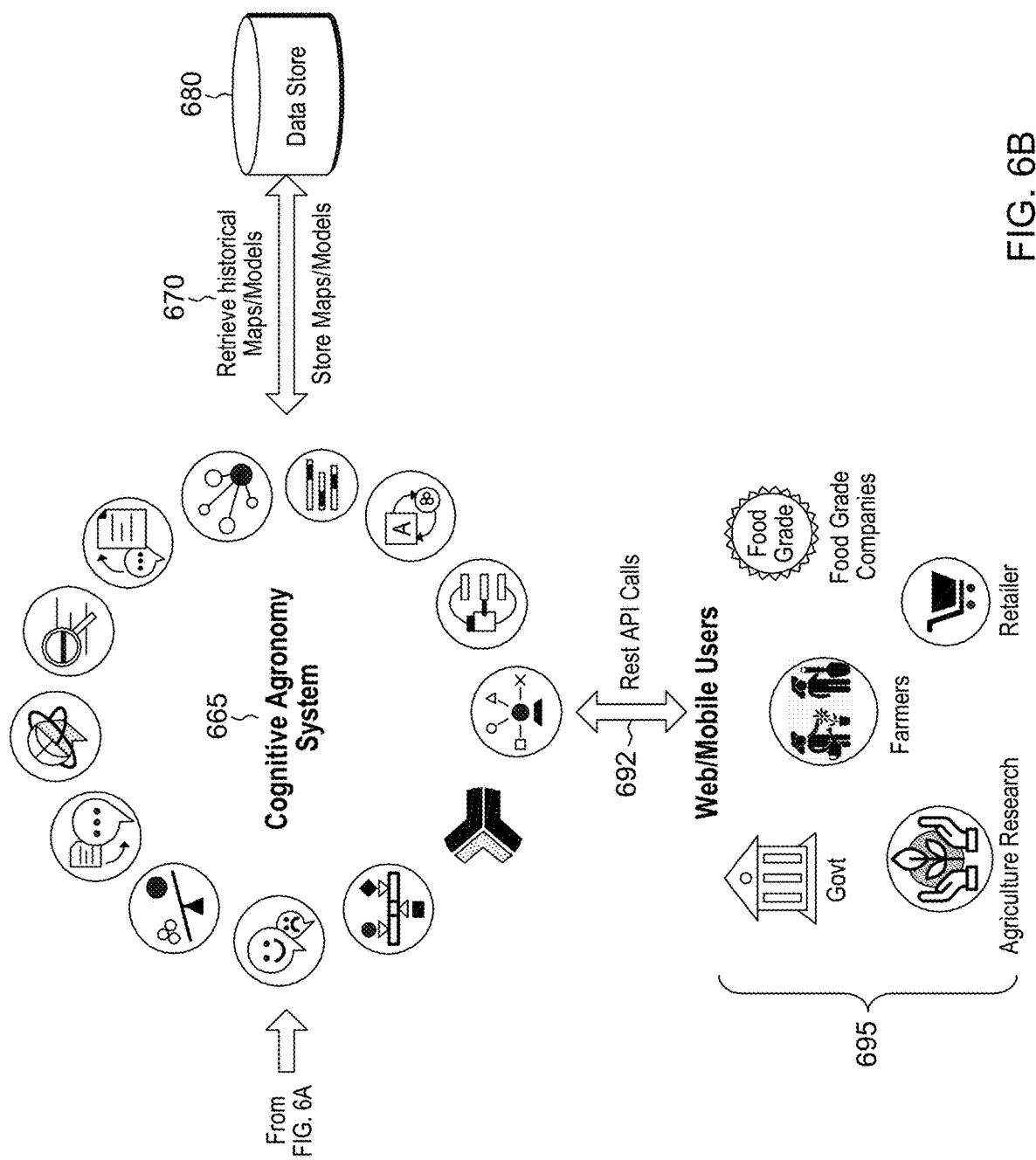

FIGS. 6A-6B, together, are a context diagram 600 that provides an overview of various aspects of some embodiments of the present invention. As illustrated in FIGS. 6A-6B, one or more programs in this cognitive agronomy system 665 accesses a variety of real time and base line data sources 610 utilizing various interfaces 620 including network connections, the Internet, and REST APIs. As illustrated in FIG. 6A, one or more programs in embodiments of the present invention utilize a variety of different data sources in order to gain valuable information about crops 616. These data sources 610 include factors that affect crops 616, referred to as affecting factors 618, including but not limited to, yielding predictions, farming methodologies, data regarding preventing crop slides, governments policies, fertilizers, soil, seed quality, location(s), seasons, animals, natural disasters, diseases and weeds, weather, irrigation, and/or human intervention(s). The base line data sources 610 may also include satellite crop monitoring data and other external data 612, including but not limited to, satellite images, weather predictions, remote sensing, local IoT data, crop specific diseases, fertilizer details, historic season/production maps and models, solid patterns/models, ancient farming best practices, reference books, butterfly/bee movement, GPS data, weed details, prescription maps, interactions with farmers, and/or historical crop maps. The data sources 610 may include collected data 614 that is collected via sensors, IoT devices, satellite image data, best management practice repositories, weather data sources, and/or social media. The various data is separated visually for ease of comprehension, but as understood by one of skill in the art, categories may overlap. In some embodiments of the present invention, the affecting factors 618 comprise elements within a given location where crops 616 are being cultivated and/or there is a desire to cultivate crops 616.

The one or more programs store and access 670 historical data from at least one data store 680. The one or more programs communicate results to a variety of different users 695, utilizing various communication methods 692, including but not limited to, in some embodiments, REST APIs.

Referring now to FIG. 7, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, an IoT device as well as computing nodes executing the one or more programs can be understood as cloud computing node 10 (FIG. 7) and if not a cloud computing node 10, then one or more general computing node that includes aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
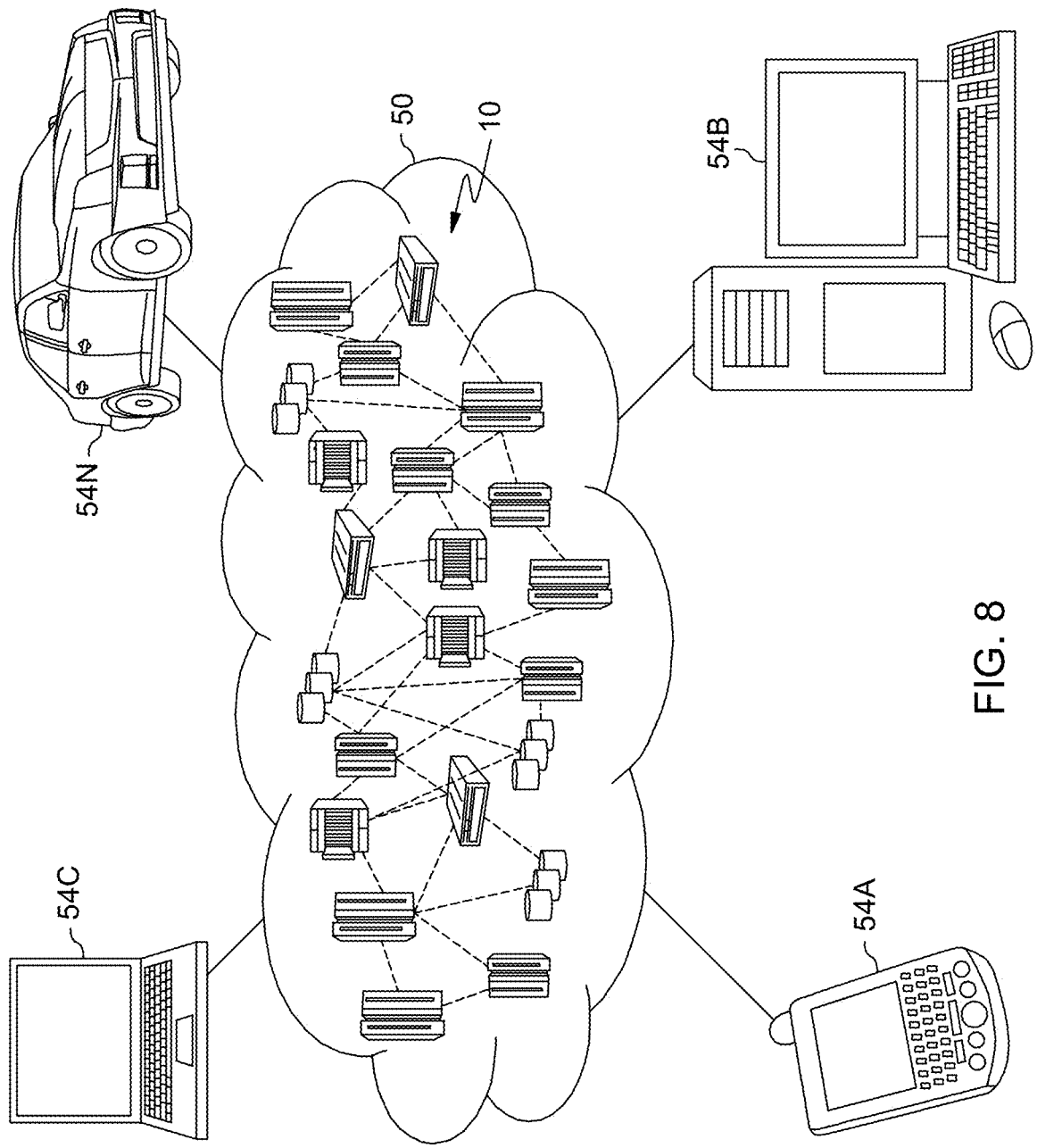
FIG. 8 depicts a cloud computing environment according to an embodiment of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
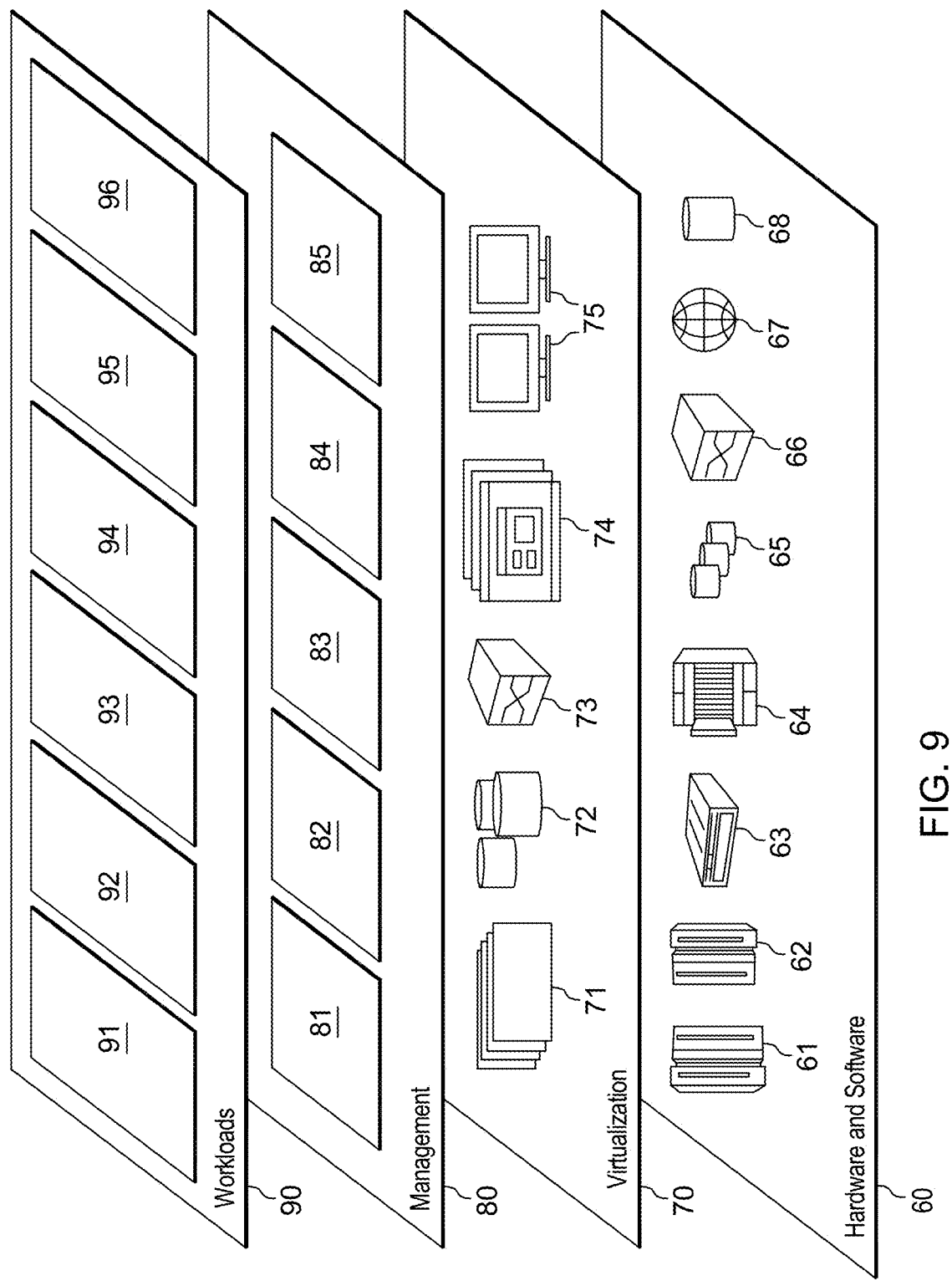
FIG. 9 depicts abstraction model layers according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing agronomical recommendations 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RANI), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
   obtaining, by one or more processors, real time data related to a given agricultural site by continuously monitoring remote data collection entities at the given agricultural site, wherein the remote data collection entities comprise satellites, ground monitoring stations, and sensors at the given agricultural site, and base line data relevant to the given agricultural site comprising Normalized Difference Vegetation Index data;
   determining, by the one or more processors, which data of the real time data can be utilized in subsequent agronomy decision-making;
   accumulating, by the one or more processors, a portion of the real time data in a data store, based on a timestamp of the portion of the real time data indicating that the portion of the real time data is no longer current and is historical data;
   in response to receiving a request for an agronomical recommendation regarding the given agricultural site from a client, querying, by the one or more processors, at least one computing resource accessible over a communications network, for agricultural data from a controlled environment, via a technology selected from the group consisting of a common gateway interface and a representational state transfer application programming interface, wherein the at least one computing resource comprises a phenotyping platform and the agricultural data comprises phenotypic data and a spectral signature of each crop grown in the controlled environment, and wherein the controlled environment comprises a laboratory;

generating, by the one or more processors, based on a cognitive analysis of the historical data, the real time data that can be utilized, the agricultural data from the controlled environment, and the base line data, at least one agricultural model, wherein the cognitive analysis comprises comparing, utilizing visual insights from at least one at least one visual recognition application programming interface, the real time data that can be utilized and the agricultural data from the controlled environment for each stage of growth for a given crop in the controlled environment and at the given agricultural site, wherein the comparing comprises comparing aspects selected from the group consisting of: crop status and crop spectral signature;

determining, by the one or more processors, based on the agricultural model, the agronomical recommendation regarding the given agricultural site;

transmitting, by the one or more processors, the agronomical recommendation to the client; and tuning, by the one or more processors, one or more algorithms utilized in the cognitive analysis to increase accuracy of the cognitive analysis, based on applying training data generated by continuously comparing the historical data, the real time data, and the agricultural data from the controlled environment.

2. The computer-implemented method of claim 1, wherein the agricultural model is selected from the group consisting of: a crop map, a crop growth model, a productivity map, and a weed map.

3. The computer-implemented method of claim 1, wherein the remote data collection entities are selected from the group consisting of: one or more geographic information systems, one or more global positioning system, and one or more sensor in at least one Internet of Things device.

4. The computer-implemented method of claim 1, wherein the generating the at least one agricultural model comprises applying a prescription map formula to generate a prescription maps for one or more of: soil type requirements, weeds regions requirements, fertilizer required region requirements, or water irrigation requirements.

5. The computer-implemented method of claim 1, wherein the at least one agricultural model a prescription map and an exploratory agronomy model, wherein the generating the at least one agricultural model comprises:

for each one of the prescription map and the exploratory agronomy model, applying, by the one or more processors, a cognitive application programming interface to the historical data, the real time data that can be utilized, and the agricultural data.

6. The computer-implemented method of claim 5, further comprising:

generating, by the one or more processors, from the prescription map and the exploratory agronomy model, cognitive linking templates; and storing, by the one or more processors, the cognitive linking templates in the data store as historical data.

7. The computer-implemented method of claim 6, wherein the at least one computing resource accessible over the communications network comprises the data store and the agricultural data from the controlled environment comprises the cognitive linking templates.

8. The computer-implemented method of claim 5, wherein the exploratory agronomy model is specific to a given crop.

9. The computer-implemented method of claim 8, wherein the agricultural data comprises forward looking data, and wherein the generating from the historical data, the real time data that can be utilized, and the agricultural data from the controlled environment, at least one agricultural model further comprises:

analyzing, by the one or more processors, one or more of the historical or the forward looking data to determine profitability of the given crop, wherein the exploratory agronomy model provides guidance for maximizing profitability of the given cop.

10. The computer-implemented method of claim 9, wherein the agronomical recommendation regarding the given agricultural site comprises guidance to maximize yield and profitability of the given crop.

11. The computer-implemented method of claim 1, wherein the generating from the historical data, the real time data that can be utilized, and the agricultural data from the controlled environment, at least one agricultural model, comprises:

deriving, by the one or more processors, relationships between the real time data that can be utilized, and the historical data; and analyzing, by the one or more processors, phenotype data model maps in the phenotypic data retrieved from the phenotyping platform.

12. The computer-implemented method of claim 11, wherein the agronomical recommendation comprises an instruction to adjust a planting mix based on historic yields and predicted weather patterns.

13. The computer-implemented method of claim 1, further comprising:

utilizing, by the one or more processors, the visual recognition application programming interfaces to identify parameters from the group consisting of: sunlight intensity, water quality, carbon dioxide proportion in air, nutrients, air humidity, temperature, drought symptoms, and salinity.

14. The computer-implemented method of claim 1, wherein the base line data further comprises data selected from a group consisting of: productivity maps, earlier analysis report, and yield maps.

15. A computer program product comprising:

a computer readable storage medium readable by one or more processors and storing instructions for execution by the one or more processors for performing a method comprising:

obtaining, by the one or more processors, real time data related to a given agricultural site by continuously monitoring remote data collection entities at the given agricultural site, wherein the remote data collection entities comprise satellites, ground monitoring stations, and sensors at the given agricultural site, and base line data relevant to the given agricultural site comprising Normalized Difference Vegetation Index data;

determining, by the one or more processors, which data of the real time data can be utilized in subsequent agronomy decision-making;

accumulating, by the one or more processors, a portion of the real time data in a data store, based on a timestamp of the portion of the real time data indicating that the portion of the real time data is no longer current and is historical data;

in response to receiving a request for an agronomical recommendation regarding the given agricultural site from a client, querying, by the one or more processors, at least one computing resource accessible over a communications network, for agricultural data from a controlled environment, via a technology selected from the group consisting of a common gateway interface and a representational state transfer application programming interface, wherein the at least one computing resource comprises a phenotyping platform and the agricultural data comprises phenotypic data and a spectral signature of each crop grown in the controlled environment, and wherein the controlled environment comprises a laboratory;

generating, by the one or more processors, based on a cognitive analysis of the historical data, the real time data that can be utilized, the agricultural data from the controlled environment, and the base line data, at least one agricultural model, wherein the cognitive analysis comprises comparing, utilizing visual insights from at least one at least one visual recognition application programming interface, the real time data that can be utilized and the agricultural data from the controlled environment for each stage of growth for a given crop in the controlled environment and at the given agricultural site, wherein the comparing comprises comparing aspects selected from the group consisting of: crop status and crop spectral signature;

determining, by the one or more processors, based on the agricultural model, the agronomical recommendation regarding the given agricultural site;

transmitting, by the one or more processors, the agronomical recommendation to the client; and tuning, by the one or more processors, one or more algorithms utilized in the cognitive analysis to increase accuracy of the cognitive analysis, based on applying training data generated by continuously comparing the historical data, the real time data, and the agricultural data from the controlled environment.

16. The computer program product of claim 15, wherein the agricultural model is selected from the group consisting of: a crop map, a crop growth model, a productivity map, and a weed map.

17. A system comprising:
a memory;
one or more processors in communication with the memory; and
program instructions executable by the one or more processors via the memory to perform a method, the method comprising:
obtaining, by the one or more processors, real time data related to a given agricultural site by continuously monitoring remote data collection entities at the given agricultural site, wherein the remote data collection entities comprise satellites, ground monitoring stations, and sensors at the given agricultural site, and base line data relevant to the given agricultural site comprising Normalized Difference Vegetation Index data;

determining, by the one or more processors, which data of the real time data can be utilized in subsequent agronomy decision-making;

accumulating, by the one or more processors, a portion of the real time data in a data store, based on a timestamp of the portion of the real time data indicating that the portion of the real time data is no longer current and is historical data;

in response to receiving a request for an agronomical recommendation regarding the given agricultural site from a client, querying, by the one or more processors, at least one computing resource accessible over a communications network, for agricultural data from a controlled environment, via a technology selected from the group consisting of a common gateway interface and a representational state transfer application programming interface, wherein the at least one computing resource comprises a phenotyping platform and the agricultural data comprises phenotypic data and a spectral signature of each crop grown in the controlled environment, and wherein the controlled environment comprises a laboratory;

generating, by the one or more processors, based on a cognitive analysis of the historical data, the real time data that can be utilized, the agricultural data from the controlled environment, and the base line data, at least one agricultural model, wherein the cognitive analysis comprises comparing, utilizing visual insights from at least one at least one visual recognition application programming interface, the real time data that can be utilized and the agricultural data from the controlled environment for each stage of growth for a given crop in the controlled environment and at the given agricultural site, wherein the comparing comprises comparing aspects selected from the group consisting of: crop status and crop spectral signature;

determining, by the one or more processors, based on the agricultural model, the agronomical recommendation regarding the given agricultural site;

transmitting, by the one or more processors, the agronomical recommendation to the client; and tuning, by the one or more processors, one or more algorithms utilized in the cognitive analysis to increase accuracy of the cognitive analysis, based on applying training data generated by continuously comparing the historical data, the real time data, and the agricultural data from the controlled environment.

* * * * *